US012755411B2

(12) United States Patent
Hong et al.

(10) Patent No.: US 12,755,411 B2
(45) Date of Patent: Oct. 6, 2026

(54) STEREO MATCHING METHOD AND IMAGE PROCESSING DEVICE PERFORMING SAME

(71) Applicant: Samsung Electronics Co., Ltd., Suwon-si (KR)

(72) Inventors: Taehwa Hong, Suwon-si (KR); Dowan Kim, Suwon-si (KR); Kimin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 293 days.

(21) Appl. No.: 18/309,234

(22) Filed: Apr. 28, 2023

(65) Prior Publication Data

US 2023/0267632 A1 Aug. 24, 2023

Related U.S. Application Data

(63) Continuation of application No. PCT/KR2021/015097, filed on Oct. 26, 2021.

(30) Foreign Application Priority Data

Oct. 30, 2020 (KR) ........................ 10-2020-0143866

(51) Int. Cl.
*G06T 7/593* (2017.01)
*G06T 7/73* (2017.01)

(52) U.S. Cl.
CPC ................ *G06T 7/593* (2017.01); *G06T 7/73* (2017.01); *G06T 2207/10012* (2013.01); *G06T 2207/30201* (2013.01)

(58) Field of Classification Search
CPC .... G06V 10/7747; G06V 20/64; G06N 3/084; G06T 11/00
See application file for complete search history.

(56) References Cited

U.S. PATENT DOCUMENTS 8,787,656 B2 7/2014 Park et al.
9,454,226 B2 * 9/2016 Kim .......................... G06T 7/73
(Continued)

FOREIGN PATENT DOCUMENTS

EP 2 774 380 B1 5/2019
EP 3 699 735 A1 8/2020
(Continued)

OTHER PUBLICATIONS

Sanja Fidler, Depth from Stereo, CSC420: Intro to Image Understanding http://www.cs.toronto.edu/~fidler/slides/2015/CSC420/lecture 12_hres.pdf.
(Continued)

*Primary Examiner* — Han Hoang
(74) *Attorney, Agent, or Firm* — Jefferson IP Law, LLP

(57) ABSTRACT

An image processing device is provided. The image processing device includes a camera configured to obtain a stereo image, an eye-tracking sensor configured to obtain gaze information of a user, a memory storing one or more instructions, and at least one processor. The at least one processor is configured to, by executing one or more instructions, extract feature points from the stereo image and generate gaze coordinate information in which gaze coordinates corresponding to the gaze information of the user are accumulated on the stereo image, and perform stereo matching based on the feature points and the gaze coordinate information.

17 Claims, 11 Drawing Sheets

(56) References Cited

U.S. PATENT DOCUMENTS

| | | | | |
|---|---|---|---|---|
| 9,674,503 | B2* | 6/2017 | Lee | G06V 20/653 |
| 10,430,959 | B2 | 10/2019 | Chang et al. | |
| 10,535,160 | B2 | 1/2020 | Kellogg et al. | |
| 10,817,054 | B2 | 10/2020 | Jeon et al. | |
| 2013/0107207 | A1* | 5/2013 | Zhao | G06V 40/19 351/246 |
| 2014/0192158 | A1 | 7/2014 | Whyte et al. | |
| 2014/0354688 | A1 | 12/2014 | Min et al. | |
| 2018/0211400 | A1* | 7/2018 | Park | G06V 30/413 |
| 2019/0026922 | A1 | 1/2019 | Kellogg et al. | |
| 2019/0156502 | A1* | 5/2019 | Lee | G06T 7/593 |
| 2021/0374994 | A1* | 12/2021 | Lu | G01S 5/16 |

FOREIGN PATENT DOCUMENTS

| | | | |
|---|---|---|---|
| JP | 2004-184240 | A | 7/2004 |
| KR | 10-2014-0055889 | A | 5/2014 |
| KR | 10-2014-0141319 | A | 12/2014 |
| KR | 10-1515484 | B1 | 4/2015 |
| KR | 10-2016-0042564 | A | 4/2016 |
| KR | 10-2017-0054183 | A | 5/2017 |
| KR | 10-1792501 | B1 | 11/2017 |
| KR | 10-2018-0000417 | A | 1/2018 |
| KR | 10-2019-0027079 | A | 3/2019 |
| KR | 10-2019-0048241 | A | 5/2019 |

OTHER PUBLICATIONS

Sanja Fidler, Stereo Epipolar Geometry for General Cameras, CSC420: Intro to Image Understanding http://www.cs.toronto.edu/~ fidler/slides/2015/CSC420/lecture13.PDF.

Epipolar Geometry, Jul. 24, 2013 https://darkpgmr.tistory.com/83.

Coordinate System, Jul. 6, 2013 https://darkpgmr.tistory.com/77.

Camera Calibration, Feb. 1, 2013 https://darkpgmr.tistory.com/32.

International Search Report dated Jan. 26, 2022, issued in International Application No. PCT/KR2021/015097.

Korean Office Action dated Jul. 22, 2025, issued in Korean Patent Application No. 10-2020-0143866.

Korean Office Action with English translation dated Apr. 22, 2026; Korean Patent Application No. 10-2020-0143866.

* cited by examiner

FIG. 4
FIRST IMAGE
GAZE COORDINATE ACCUMULATION
SECOND IMAGE
ACCUMULATED
3D GAZE COORDINATES
$p_1(x, y, z)$
$p_2(x, y, z)$
$p_m(x, y, z)$
REPROJECTION
$(U_L,V_L)$
$(U_R,V_R)$
@T1
@T2
@Tn
GAZE COORDINATE INFORMATION

STEREO MATCHING METHOD AND IMAGE PROCESSING DEVICE PERFORMING SAME

CROSS-REFERENCE TO RELATED APPLICATION(S)

This application is a continuation application, claiming priority under § 365(c), of an International application No. PCT/KR2021/015097, filed on Oct. 26, 2021, which is based on and claims the benefit of a Korean patent application number 10-2020-0143866, filed on Oct. 30, 2020, in the Korean Intellectual Property Office, the disclosure of which is incorporated by reference herein in its entirety.

BACKGROUND

1. Field

The disclosure relates to a stereo matching method and an image processing device performing the method.

2. Description of Related Art

When a user experiences augmented reality or virtual reality, visual experience has to be provided by reflecting movement of the user in real time. Thus, it is important to rapidly and accurately obtain information about a user's position and an object in a three-dimensional (3D) space. A 3D virtual object or a real-world object has 3D position information in a space and may interact with the user.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a stereo matching method performing rapid stereo matching by referring to gaze coordinates in a stereo image and an image processing device performing the method.

Additional aspects will be set forth in part in the description which follows and, in part, will be apparent from the description, or may be learned by practice of the presented embodiments.

In accordance with an aspect of the disclosure, an image processing device is provided. The image processing device includes a camera configured to obtain a stereo image, an eye-tracking sensor configured to obtain gaze information of a user, a memory storing one or more instructions, and at least one processor configured to execute the one or more instructions, wherein the at least one processor is configured to extract feature points from the stereo image and generate gaze coordinate information in which gaze coordinates corresponding to the gaze information of the user are accumulated on the stereo image, and perform stereo matching based on the feature points and the gaze coordinate information.

In accordance with another aspect of the disclosure, a stereo matching method is provided. The stereo matching method includes obtaining a stereo image by using a camera, extracting feature points from the stereo image, generating gaze coordinate information in which gaze coordinates corresponding to gaze information of a user are accumulated on the stereo image, and performing stereo matching based on the feature points and the gaze coordinate information.

In accordance with another aspect of the disclosure, a computer-readable recording medium is provided. The computer-readable recording medium includes instructions for obtaining a stereo image by using a camera, extracting feature points from the stereo image, generating gaze coordinate information in which gaze coordinates corresponding to gaze information of a user are accumulated on the stereo image, and performing stereo matching based on the feature points and the gaze coordinate information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
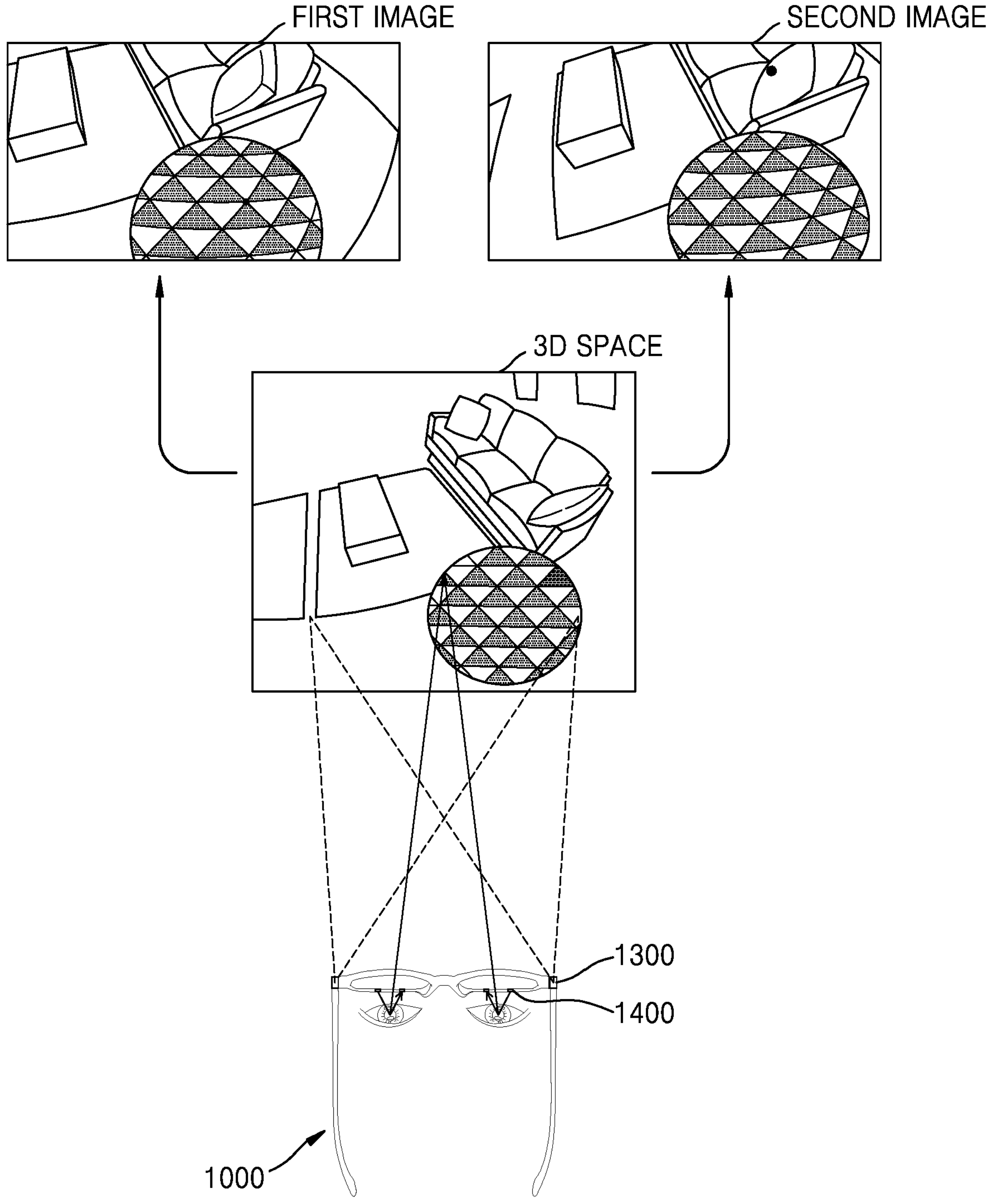
FIG. 1 is a diagram of an image processing device performing stereo matching according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

It will be further understood that the terms “comprises” and/or “comprising,” when used in this specification, specify the presence of stated components, but do not preclude the presence or addition of one or more components. In addition, the terms such as “ . . . unit”, “module”, etc. provided herein indicates a unit performing at least one function or operation, and may be realized by hardware, software, or a combination of hardware and software.

In description of the disclosure, the terms “first” and “second” may be used to describe various components, but the components are not limited by the terms. The terms may be used to distinguish one component from another component.

One or more embodiments relate to a stereo matching method and an image processing device performing the method. Detailed descriptions about elements well known to one of ordinary skill in the art to which the embodiments herein pertain will be omitted.

In the disclosure, an image processing device may be a generic term for an electronic device capable of generating or processing an image. The image processing device may generate a depth map indicating depth information about a space including an object, as well as an image of a scene including the object. The image processing device may be an augmented reality device, a virtual reality device, a smartphone, a digital camera, etc.

In the disclosure, ‘augmented reality (AR)’ used herein is a technology that overlays a virtual image on a physical environment space of the real world or a real-world object and a virtual image along with each other. An augmented reality device denotes a device capable of representing augmented reality, and may include augmented reality glasses, as well as a head mounted display apparatus (HMD) or an augmented reality helmet.

In the disclosure, ‘virtual reality (VR)’ denotes showing a virtual image to be experienced as reality in a virtual space. A ‘virtual reality device’ denotes a device capable of representing ‘virtual reality’, and may include an HMD, a virtual reality helmet, or a goggle-type display apparatus capable of covering the view of the user.

FIG. 1 is a diagram of an image processing device 1000 performing a stereo matching according to an embodiment of the disclosure.

In FIG. 1, an example in which the image processing device 1000 is augmented reality glasses including a camera 1300 for obtaining a three-dimensional (3D) image is shown, but kinds of the image processing device 1000 are not limited to the example of FIG. 1. Referring to FIG. 1, when the image processing device 1000 is augmented reality glasses, the camera 1300 may be located at a side facing forward in a portion where a lens frame supporting each lens portion and a temple of glasses for placing the image processing device 1000 on the face of a user meet each other, but is not limited thereto. An eye-tracking sensor 1400 may be located on one surface of glass frame facing the face of the user, so as to detect the eye of the user, but is not limited thereto.

The image processing device 1000 may estimate depth information about a space for modeling a 3D space. The image processing device 1000 may estimate depth information about the space by using a focal length of the lens in the camera 1300, a distance between a first camera and a second camera, and a distance between feature points matched through stereo matching, that is, disparity, and may generate a depth map based on the estimated depth information. In order to provide visual experience by reflecting movement of the user in real-time, the image processing device 1000 has to be able to rapidly perform the stereo matching that is an operation of matching corresponding feature points in stereo images obtained by the camera 1300.

However, in the stereo image in which the stereo matching has to be performed, when there are a plurality of similar feature points or a disparity between corresponding feature points is large, for example, when the space is in an environment where repeated patterns exist or when a subject that the user sees is at a close position, the time taken for the stereo matching may increase or there may be an error in the stereo matching.

Therefore, a method of performing the stereo matching by using the view information of the user by the image processing device 1000 will be described below, so that the stereo matching may be rapidly and accurately performed even with respect to the space where the repeated patterns exist or the situation where the subject that the user sees is at adjacent position.

Figure 2:
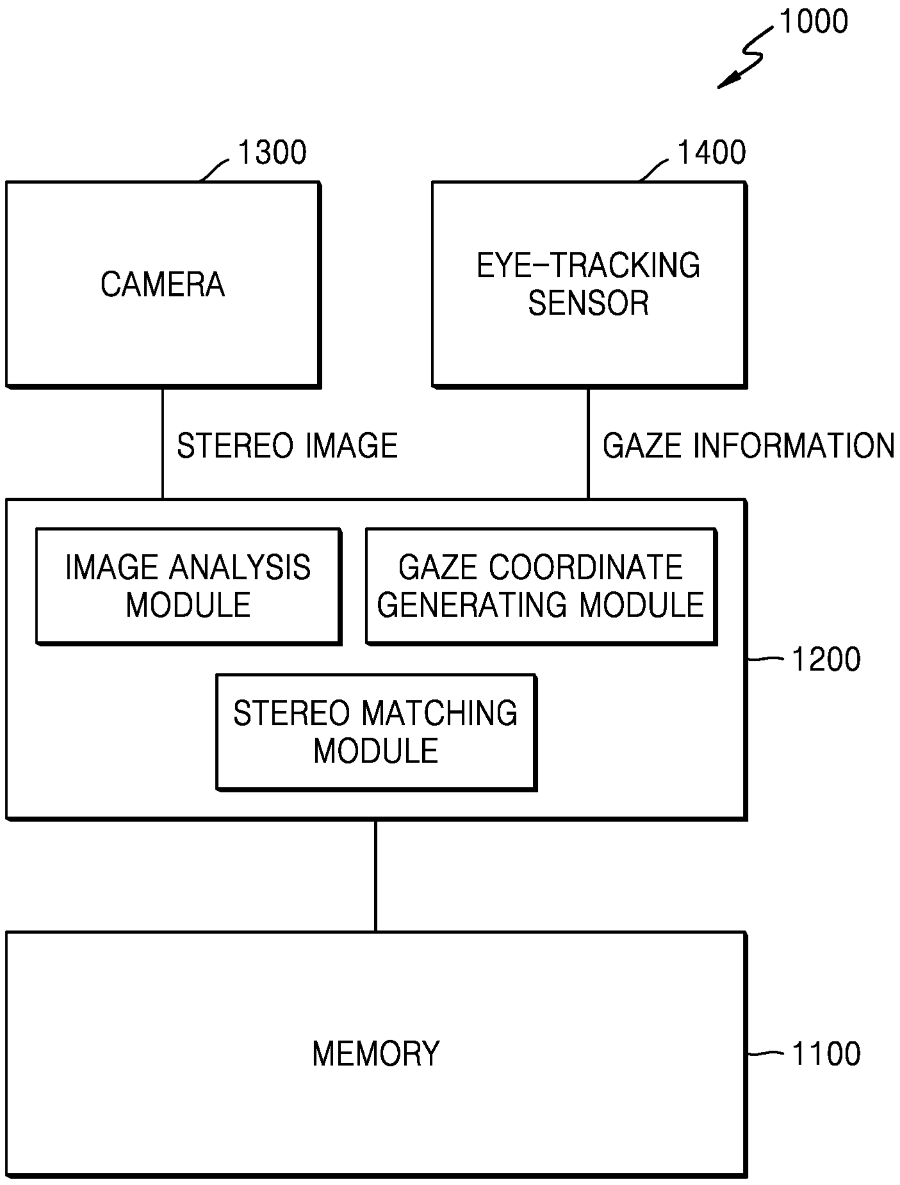
FIG. 2 is a diagram for describing a structure and operations of an image processing device according to an embodiment of the disclosure.

FIG. 2 is a diagram for describing a structure and operations of the image processing device 1000 according to an embodiment of the disclosure.

Referring to FIG. 2, an image processing device 1000 may include a memory 1100, a processor 1200, a camera 1300, and an eye-tracking sensor 1400. One of ordinary skill in the art of the embodiment would understand that other universal elements than the elements shown in FIG. 2 may be further included.

The memory 1100 may store instructions that may be executable by the processor 1200. The memory 1100 may store programs consisting of instructions. The memory 1100 may include, for example, a hardware device of at least one type from among a random access memory (RAM), a static RAM (SRAM), a read-only memory (ROM), a flash memory, an electrically programmable ROM (EEPROM), a programmable ROM (PROM), a magnetic memory, a magnetic disk, and an optical disk.

The memory 1100 may store at least one software module including instructions. Each software module is executed by the processor 1200 so that the image processing device 1000 may perform a certain operation or function. For example, as shown in FIG. 2, an image analysis module, a gaze coordinate generating module, and a stereo matching module may be executed by the processor 1200, but one or more embodiments are not limited thereto, that another software module may be further included.

The processor 1200 may control the operation or function performed by the image processing device 1000 by executing instructions stored in the memory 1100 or programmed software module. The processor 1200 may include a hardware element performing calculation, logic, input/output operation, and signal processing.

The processor 1200 may include, for example, at least one hardware element from among a central processing unit (CPU), a microprocessor, a graphic processing unit (GPU), an application specific integrated circuit (ASIC), a digital signal processor (DSP), a digital signal processing device (DSPD), a programmable logic device (PLD), and a field programmable gate array (FPGA).

The camera 1300 may be a stereo camera obtaining a stereo image, and may include a first camera obtaining a first image and a second camera obtaining a second image. The stereo image may include a first image and a second image. One of the first image and the second image may be a reference image and the other may be a comparison image. One of the first image and the second image may be a left image and the other may be a right image. Hereinafter, for convenience of description, it will be assumed that the first image is a reference image and a left image and the second image is a comparison image and a right image.

The camera 1300 may include the first camera and the second camera respectively located on certain portions of the image processing device 1000. The camera 1300 may include a lens module including lenses, an auto-focus (AF) actuator, an image sensor, and an image signal processor. The lens module may have a structure in which a plurality of lenses are arranged in a barrel portion so that light incident from outside may pass through the lenses. The AF actuator may move the lenses to optimal focusing positions in order to obtain an image of clear image quality. The image signal processor may convert an electrical signal converted by the image sensor into an image signal.

The eye-tracking sensor 1400 may detect gaze information such as a direction of the eyes of the user, a pupil location in the user's eye, center point coordinates of the pupil, etc. For example, the eye-tracking sensor 1400 may track movement of the pupil by detecting the pupil from the captured image by irradiating infrared light the user's eye and receiving reflected light. The processor 1200 may determine the type of eye movement based on the gaze information of the user detected by the eye-tracking sensor 1400. For example, the processor 1200 may determine, based on the gaze information obtained from the eye-tracking sensor 1400, various types of eye movement including fixation to look at any one place, pursuit to follow moving objects, a saccade in which the gaze moves quickly from one gaze point to another.

According to the above elements, the processor 1200 may perform the stereo matching by executing one or more instructions stored in the memory 1100. The processor 1200 may perform the stereo matching by loading and executing an image analysis module, a gaze coordinate generation module, and a stereo matching module from the memory 1100. The image analysis module, the gaze coordinates generation module, and the stereo matching module may be implemented as processing modules in units of detailed function processes or integrated-type processing module.

The processor 1200 may operate the camera 1300 obtaining the stereo image in parallel with the eye-tracking sensor 1400 obtaining the gaze information of the user. The processor 1200, for example, extracts feature points from the stereo image and generates gaze coordinate information in the gaze coordinates corresponding to the gaze information of the user are accumulated on the stereo image, and then may perform the stereo matching based on the feature points and the gaze coordinate information.

For example, the processor 1200 may extract the features points from the stereo image by executing the image analysis module. The processor 1200 may extract at least one feature point from a first image, obtain an epipolar line of a second image, which corresponds to the coordinate of a first feature point in the first image, and may extract at least one feature point of the second image within a restricted range on the obtained epipolar line. Hereinafter, this will be described in detail below with reference to FIG. 3.

Figure 3:
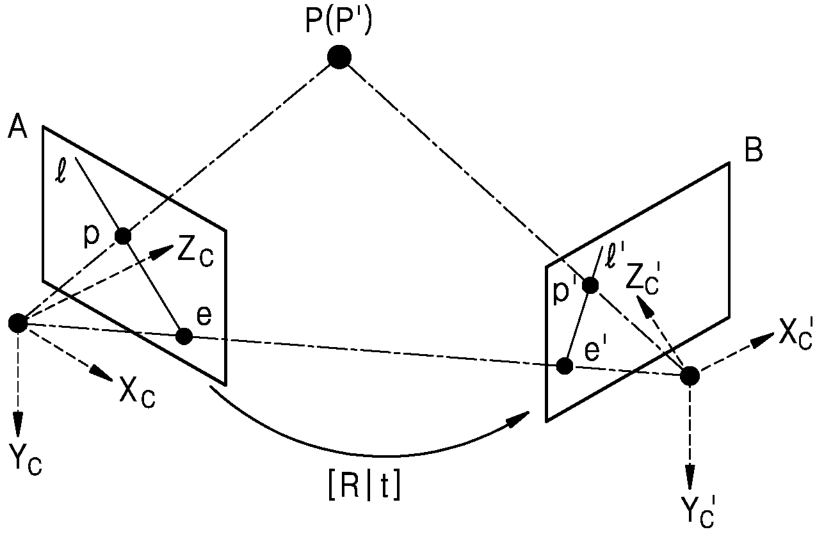
FIG. 3 is a diagram for describing a geometrical relationship between a corresponding coordinate pair in a stereo image with respect to one equivalent point in a three-dimensional (3D) space according to an embodiment of the disclosure.

FIG. 3 is a diagram for describing a geometrical relationship between corresponding coordinate pair in a stereo image with respect to one equivalent point in a 3D space according to an embodiment of the disclosure.

Referring to FIG. 3, when a stereo image of the 3D space is obtained, a pair of corresponding coordinates (p, p') in a first image A captured by the first camera and a second image B captured by the second camera at different location from that of the first camera with respect to a certain point P(P') in a 3D space are shown.

{Xc,Yc,Zc} denotes a first camera coordinate system corresponding to the first camera having a lens focus as an origin, wherein Xc denotes a right side of the first camera, Yc denotes a lower side of the first camera, and Zc denotes an optical axis direction facing the front of the first camera. {Xc',Yc',Zc' } denotes a second camera coordinate system corresponding to the second camera having a lens focus as an origin, wherein Xc' denotes a right side of the second camera, Yc' denotes a lower side of the second camera, and Zc' denotes an optical axis direction facing the front of the second camera. P denotes a certain point in the 3D space in the first camera coordinate system. With respect to the same point, P' denotes a coordinate in the 3D space in the second camera coordinate system.

A coordinate p included in the first image A and a coordinate p' included in the second image B correspond to a point of a certain point P(P') in the 3D space projected respectively on the first image A and the second image B. The coordinate p included in the first image A and the coordinate p' included in the second image B may form a pair of corresponding coordinates.

In an embodiment, a triangular plane formed by a line connecting the origin of the first camera coordinate system to P, a line connecting the origin of the second camera coordinate system to P', and a line connecting the origin of the first camera coordinate system to the origin of the second camera coordinate system is referred to as an epipolar plane. Here, virtual points e and e' where the line connecting the origin of the first camera coordinate system to the origin of the second camera coordinate system meets the first image A and the second image B are referred to as epipoles. A line 1 connecting a coordinate p included in the first image A to the epipole e or a line 1' connecting the coordinate p' included in the second image B to the epipole e' is referred to as an epipolar line that corresponds to an intersection where the epipolar plane meets each of the first image A and the second image B.

In another embodiment, a geometrical relationship [R|t] between the first image A and the second image B corresponds to a geometrical relationship between the first camera coordinate system and the second camera coordinate system. When the geometrical relationship [R|t] between the first image A and the second image B and the coordinate p of the first image A are given, and when depth information from the coordinate p of the first image A to the point P(P') in the 3D space is not known, the point P(P') in the 3D space before being projected from the coordinate p may not be reconstructed. Points on the line between the origin of the first camera coordinate system and the point P(P') in the 3D space are all projected on the coordinate p of the first image A. It is because that the point in the 3D space may not be specified provided that the depth information from the coordinate p of the first image A to a certain point in the 3D space is not known.

Consequently, the coordinate p' that is obtained by projecting the point P(P') in the 3D space on the second image B may not be specified, either. However, because the point P(P') in the 3D space exists on the straight line connecting the origin of the first camera to the coordinate p of the first image A, when the straight line is projected on the second image B, it is identified that the coordinate p' of the second image B is on the projected straight line. In FIG. 3, the epipolar line 1' corresponds to the projected straight line.

When the depth information of the point P(P') in the 3D space is not known, the coordinate p' of the second image B corresponding to the coordinate p of the first image A may not be specified, but the epipolar line 1' passing through the coordinate p' of the second image B may be specified. For example, examples of transformation matrices calculating the corresponding epipolar line of the second image B from the coordinate of the first image A may include fundamental matrix, essential matrix, etc.

According to the above description, in order to rapidly find the coordinate p' corresponding to the feature point of the second image B, which corresponds to the feature point of the first image A, searching of a restricted area in the second image B based on the coordinate p of the first image A may be considered. That is, instead of comparing the entire coordinates of the feature points distributed in the entire area of the second image B with the coordinate p, it may come up with that the corresponding epipolar line 1' of the second image B with respect to the coordinate p of the first image A is obtained and the coordinates in the restricted range on the obtained epipolar line 1' may be compared with the coordinate p.

In addition, finding the coordinate p' of the second image B corresponding to the coordinate p of the first image A, that is, finding where the coordinate p' of the second image B is located on the epipolar line 1', corresponds to the stereo matching, and accordingly, the coordinate p' of the second image B may be determined. When the coordinate p of the first image A, the coordinate p' of the second image B, and the geometrical relationship [R|t] between the first image A and the second image B are all determined, the depth information to the point P(P') of the 3D space may be determined according to triangulation and the point P(P') in the 3D space may be calculated.

Referring back to FIG. 2, the processor 1200 may generate the gaze coordinate information in which the gaze coordinates corresponding to the gaze information of the user are accumulated on the stereo image by executing the gaze coordinates generation module. The processor 1200 may perform the process of generating the gaze coordinate information and the process of extracting the feature points from the stereo image in parallel. The processor 1200 may obtain a coordinate pair of the gaze coordinates in the stereo image based on the gaze information obtained by using the eye-tracking sensor 1400, and may accumulate the 3D gaze coordinates obtained from the coordinate pair on the memory 1100. The processor 1200 may generate the gaze coordinate information by re-projecting the 3D gaze coordinates accumulated on the memory 1100 on the stereo image. Hereinafter, this will be described in detail with reference to FIG. 4.

Figure 4:
FIG. 4 is a diagram for describing a process of generating gaze coordinate information used in a stereo matching method according to an embodiment of the disclosure.

FIG. 4 is a diagram for describing a process of generating gaze coordinate information used in a stereo matching method according to an embodiment of the disclosure.

In an embodiment, when the geometrical relationship between the first camera coordinate system of the first camera and the second camera coordinate system of the second camera is known, as described above with reference to FIG. 3, a coordinate of one point in the 3D space may be specified based on the coordinate of the second image corresponding to a certain coordinate of the first image according to the triangulation. This may be also applied to the gaze coordinates of the gaze of the user in the first image and the corresponding gaze coordinates of the gaze of the user in the second image. Therefore, when a certain gaze coordinate in the first image and a corresponding gaze coordinate in the second image are known, a 3D gaze coordinate in the 3D space may be calculated.

Referring to FIG. 4, first images captured by the first camera and second images captured by the second camera are shown over time. At each point in time, the gaze coordinates in the first image are ($U_L$, $V_L$) and corresponding gaze coordinates in the second image are represented as ($U_R$, $U_R$).

According to the triangulation, at a point in time T1, 3D gaze coordinate P1($x,y,z$) may be calculated based on the gaze coordinates of the first image and the gaze coordinates of the second image, and at a point in time T2, 3D gaze coordinate P2($x,y,z$) may be calculated based on the gaze coordinates of the first image and the gaze coordinates of the second image. In the same manner, at a point in time Tm, 3D gaze coordinate Pm(x,y,z) may be calculated based on the gaze coordinates of the first image and the gaze coordinates of the second image. Accordingly, from the point in time T1 to the point in time Tm, when the pairs of gaze coordinates of the first and second images are accumulated, the 3D gaze coordinates P1 to Pm may be accumulated. The accumulated 3D gaze coordinates may be stored in the memory 1100.

In an embodiment, the accumulated 3D gaze coordinates as above may be re-projected on the first image and the second image at a certain point in time later. As shown in FIG. 4, at a point in time Tn, the 3D gaze coordinates accumulated in previous points in time (e.g., from T1 to Tm) are re-projected onto the first and second images at the point in time Tn, and thus, the gaze coordinates of the user at the previous points of time, as well as the gaze coordinates of the user at the point in time Tn, may be represented in the first image and the second image. The gaze coordinate information in which the gaze coordinates corresponding to the gaze information of the user at a certain point in time, as well as the previous points in time, are accumulated may be provided to the first and second images.

The gaze coordinate information may be in the form of gaze coordinate map including the gaze coordinates in the stereo image. The gaze coordinate map may denote the gaze coordinates themselves in the stereo image or may connect adjacent gaze coordinates to each other. From the gaze coordinate information of the first image and the second image, the coordinate pairs of the corresponding gaze coordinates may be identified.

In an embodiment, the processor 1200 may obtain a coordinate pair of the gaze coordinates in the stereo image based on the gaze information obtained by using the eye-tracking sensor 1400, and may accumulate the 3D gaze coordinates obtained from the coordinate pair on the memory 1100. The processor 1200 may generate the gaze coordinate information by re-projecting the 3D gaze coordinates accumulated on the memory 1100 on the stereo image.

Referring back to FIG. 2, the processor 1200 may perform the stereo matching based on the feature points and the gaze coordinate information of the stereo image, by executing the stereo matching module. The processor 1200 may perform the stereo matching by restricting a search range of the second image as a certain range from a second gaze coordinate corresponding to a first gaze coordinate near a first feature point of the first image. The first gaze coordinate may be a gaze coordinate closest to a coordinate of the first feature point, from among the gaze coordinates forming the gaze coordinate information, and may be within a certain distance from the first feature point.

The processor 1200 may obtain a second feature point of the second image corresponding to the first feature point of the first image, based on the restricted range on the epipolar line of the second image, which corresponds to the coordinate of the first feature point of the first image, and a certain range from the second gaze coordinate of the second image corresponding to the first gaze coordinate near the first feature point of the first image.

In an embodiment, the processor 1200 identifies the first gaze coordinate near the first feature point of the first image, and based on an identification result, may determine the searching range of the second image. When there is the first gaze coordinate near the first feature point of the first image, the processor 1200 may determine the searching range to be within a certain range from the second gaze coordinate corresponding to the first gaze coordinate in the second image. Accordingly, the processor 1200 may search for the feature point that is included in both of the certain range from the second gaze coordinate of the second image and the restricted range on the epipolar line of the second image corresponding to the coordinate of the first feature point of the first image. When there is no first gaze coordinate near the first feature point of the first image, the processor 1200 may determine the search range to be within a predefined range. Accordingly, the processor 1200 may search for the feature point included in the restricted range on the epipolar line of the second image, which corresponds to the coordinate of the first feature point of the first image.

In another embodiment, the processor 1200 may obtain the second feature point of the second image, which corresponds to the first feature point, within the search range. The processor 1200 may obtain, from among the feature points within the search range, a feature point having the highest similarity to the feature information of the first feature point as the second feature point.

Figure 5:
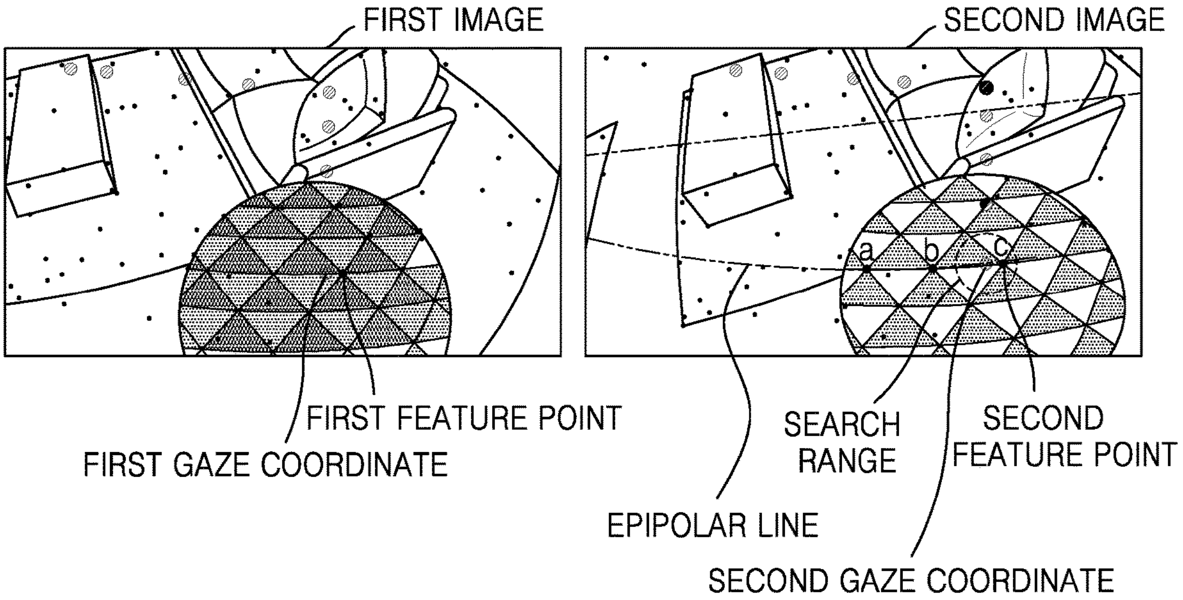
FIG. 5 is a diagram showing an example of processes of performing stereo matching according to an embodiment of the disclosure.

FIG. 5 is a diagram of an example of processes of performing stereo matching according to an embodiment of the disclosure.

Referring to FIG. 5, a process of matching the first feature point of the first image that is the reference image to the corresponding second feature point in the second image that is the comparison image in the stereo image is shown.

In an embodiment, the processor 1200 of the image processing device 1000 may extract a plurality of feature points from the stereo image. In the first image or the second image, an edge or corner corresponding to a boundary line where pixel values rapidly change, or a boundary point between different objects, etc. may correspond to the feature points.

When the processor 1200 of the image processing device 1000 searches all feature points extracted from the second image for the second feature point corresponding to the first feature point of the first image, real-time operation of the image processing device 1000 may not be secured. Therefore, the processor 1200 of the image processing device 1000 restricts the search range for the second feature point in the second image, so that the stereo matching may be rapidly performed. As described above with reference to FIG. 3, by using the coordinate of the first feature point in the first image, the corresponding epipolar line is obtained from the second image, and the feature information of the first feature point is compared with the restricted range on the epipolar line. Thus, the stereo matching may be rapidly performed.

However, as shown in FIG. 5, when an environment in which a pattern is repeatedly arranged is widely distributed in the space, there may be a plurality of similar feature points within the restricted range of the second image, and thus, accuracy and rapidity of the feature matching may degrade. With respect to the above case, the processor 1200 of the image processing device 1000 may use the gaze coordinate corresponding to the gaze information of the user in the stereo image. With respect to a plurality pieces of gaze information, the gaze coordinate information in which the gaze coordinates corresponding to the gaze information are accumulated on the stereo image may be generated in the manner of re-projecting the 3D gaze coordinate obtained from the coordinate pair of the gaze coordinates corresponding to the gaze information onto the stereo image.

Referring to FIG. 5, the processor 1200 of the image processing device 1000 may search for candidates for the second feature points within a restricted range on the corresponding epipolar line of the second image based on the coordinate of the first feature point in the first image. Referring to FIG. 5, candidates a, b, and c for the second feature point corresponding to the first feature point may be searched from the restricted range on the epipolar line of the second image.

In an embodiment, the processor 1200 of the image processing device 1000 may identify a coordinate of the first feature point in the first image and a first gaze coordinate near the first feature point of the first image in order to rapidly and accurately obtain the second feature point of the second image, the second feature point corresponding to the first feature point of the first image. The first gaze coordinate may be a gaze coordinate closest to a coordinate of the first feature point, from among the gaze coordinates forming the gaze coordinate information, and may be within a certain distance from the first feature point.

In order to improve the accuracy and rapidity in feature point matching, the processor 1200 of the image processing device 1000 may further restrict the search range of the second image to be within a certain range from a second gaze coordinate corresponding to the first gaze coordinate. Referring to FIG. 5, because a point c, from among the candidates a, b, and c for the second feature point in the second image, corresponds to the search range that is within a certain range from the second gaze coordinate, the second feature point corresponding to the first feature point may be found rapidly and accurately.

The processor 1200 of the image processing device 1000 may rapidly and accurately obtain the second feature point of the second image, which corresponds to the first feature point of the first image, based on the restricted range on the epipolar line of the second image corresponding to the coordinate of the first feature point of the first image and the certain range from the second gaze coordinate of the second image corresponding to the first gaze coordinate near the first feature point of the first image.

Figure 6:
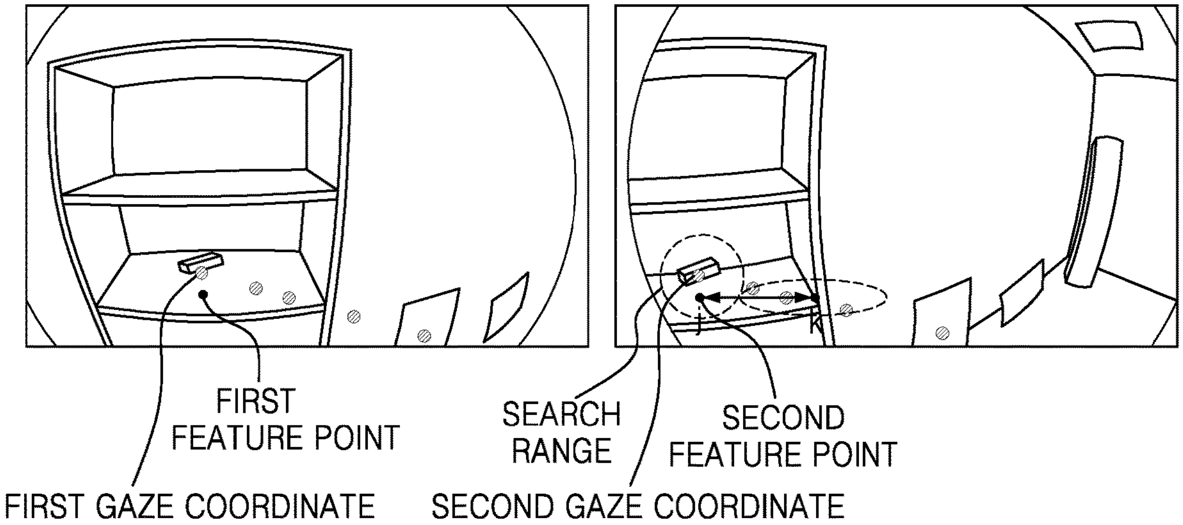
FIG. 6 is a diagram of another example for describing processes of performing stereo matching according to an embodiment of the disclosure.

FIG. 6 is a diagram showing another example of processes of performing stereo matching according to an embodiment of the disclosure.

Referring to FIG. 6, when the disparity between the corresponding feature points is large in the stereo image in which the stereo matching is to be performed, for example, when a subject that the user sees is at close distance, a difference between the coordinates indicating the same feature points in the first and second images is increased. Thus, when the second feature point corresponding to the first feature point exceeds the search range defined in advance in the second image, the first feature point may fail to match.

Referring to FIG. 6, when it is assumed that a point on a screen of the second image, which corresponds to the coordinate of the first feature point in the first image, is a point k, the disparity between the first feature point and the second feature point is increased, and it may fail to detect the second feature point corresponding to the first feature point in the search range defined in advance around the point k. When there is no feature point included in both the restricted range on the epipolar line of the second image corresponding to the coordinate of the first feature point in the first image and the certain range around the point k, the first feature point fails to match.

In the above case, the processor 1200 of the image processing device 1000 generates the gaze coordinate information in which the gaze coordinates corresponding to the gaze information of the user are accumulated on the stereo image to perform the stereo matching, and thus, the feature points may be matched rapidly and accurately.

In an embodiment, the processor 1200 of the image processing device 1000 may identify the coordinate of the first feature point of the first image and the first gaze coordinate around the first feature point. The first gaze coordinate may be a gaze coordinate closest to a coordinate of the first feature point, from among the gaze coordinates forming the gaze coordinate information, and may be within a certain distance from the first feature point. The processor 1200 of the image processing device 1000 may match the feature points rapidly and accurately by restricting the search range of the second image to be a certain range from the second gaze coordinate corresponding to the first gaze coordinate, and obtaining a feature point (point j) detected from the certain range from the second gaze coordinate as the second feature point corresponding to the first feature point. For example, the processor 1200 of the image processing device 1000 may obtain the second featured of the second image corresponding to the first feature point of the first image, based on the certain range from the second gaze coordinate of the second image corresponding to the first gaze coordinate near the first feature point of the first image and the restricted range on the epipolar line of the second image corresponding to the coordinate of the first feature point in the first image.

Figure 7:
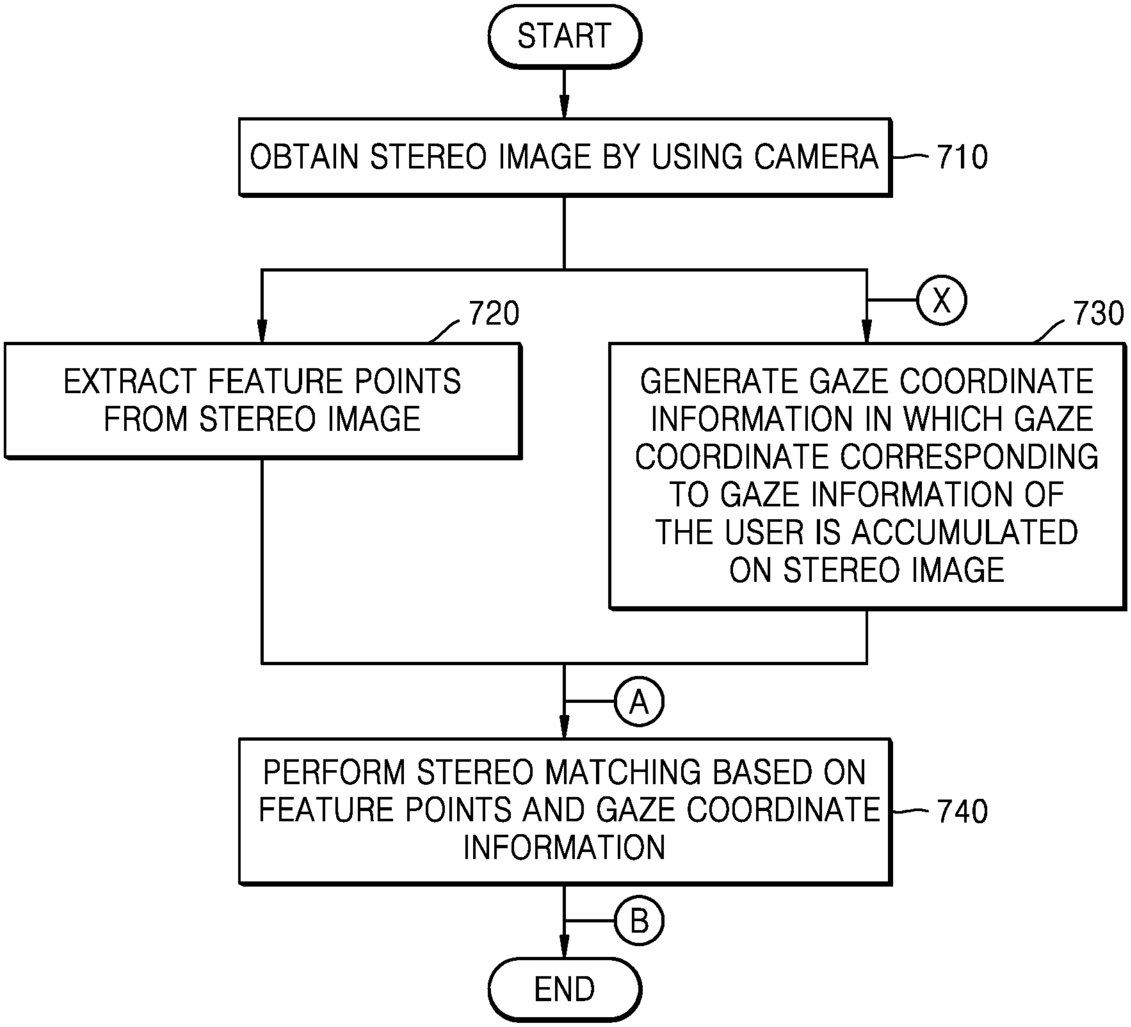
FIG. 7 is a flowchart illustrating a stereo matching method according to an embodiment of the disclosure.

FIG. 7 is a flowchart illustrating a stereo matching method according to an embodiment of the disclosure.

The above descriptions provided about the image processing device 1000 may be all applied to the stereo matching method even when omitted.

In operation 710, the image processing device 1000 may obtain a stereo image by using a camera. The image processing device 1000 may obtain a first image and a second image through a first camera and a second camera.

In operation 720, the image processing device 1000 may extract feature points from the stereo image. The image processing device 1000 may extract at least one feature point from a first image, obtain an epipolar line of a second image, which corresponds to the coordinate of a first features point in the first image, and may extract at least one feature point of the second image within a restricted range on the obtained epipolar line.

In operation 730, the image processing device 1000 may generate gaze coordinate information in which gaze coordinates corresponding to gaze information of the user are accumulated on the stereo image. The gaze coordinate information may be in the form of gaze coordinate map including the gaze coordinates in the stereo image. From the gaze coordinate information of the first image and the second image, the coordinate pairs of the corresponding gaze coordinates may be identified. Operation 730 may be performed in parallel with operation 720. Processing in parallel denotes that at least some of one process is simultaneously performed with at least some of another process. In addition, because the gaze coordinate information is generated by using the gaze coordinates accumulated on the stereo image during a certain time period, and thus, a preparing process for generating the gaze coordinate information will be described in detail below with reference to FIG. 8.

Figure 8:
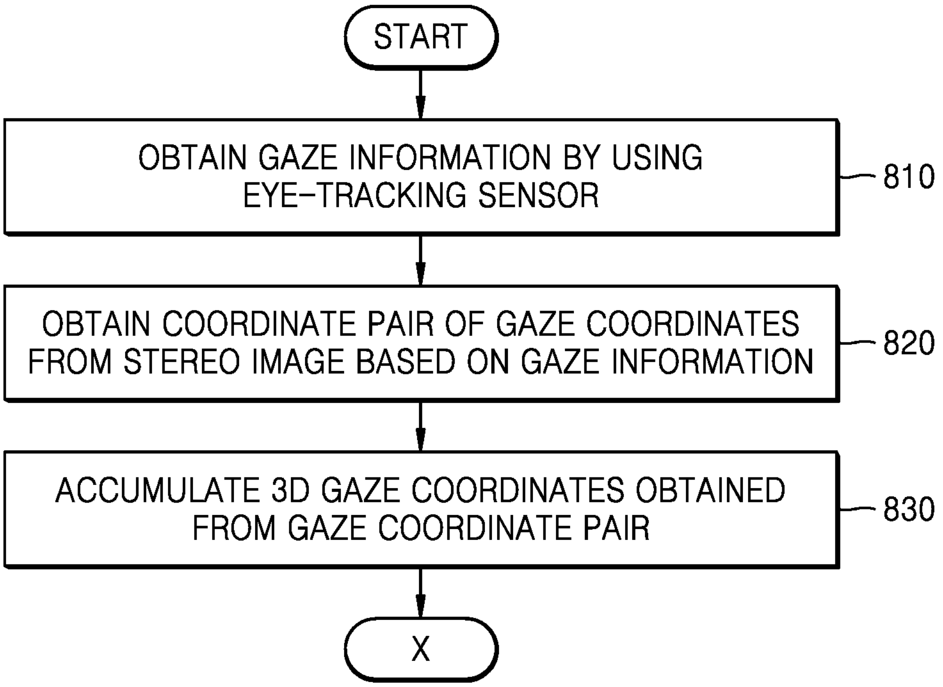
FIG. 8 is a flowchart for describing a preparation process for generating gaze coordinate information used in a stereo matching method according to an embodiment of the disclosure.

FIG. 8 is a flowchart for describing preparation process for generating gaze coordinate information used in a stereo matching method according to an embodiment of the disclosure.

In operation 810, the image processing device 1000 may obtain gaze information by using the eye-tracking sensor 1400. The image processing device 1000 may detect the gaze information such as the direction in which the user's eye sees, the pupil position of the user's eye, a coordinate of the center point in the pupil, etc. by controlling the eye-tracking sensor 1400.

In operation 820, the image processing device 1000 may obtain a coordinate pair of the gaze coordinates from the stereo image based on the obtained gaze information. The image processing device 1000 may obtain the gaze coordinate of the first image and the gaze coordinate of the second image as the coordinate pair.

In operation 830, the image processing device 1000 may accumulate 3D gaze coordinates obtained from the coordinate pairs of the gaze coordinates. The image processing device 1000 may obtain the 3D gaze coordinates in the 3D space according to the triangulation and may update the obtained 3D gaze coordinates in the memory 1100, based on a certain gaze coordinate of the first image and a corresponding gaze coordinate of the second image.

Operation 810 to operation 830 may be performed at a certain time interval or may be repeatedly performed within a certain time period. The certain time interval or the certain time period may be adjusted. Accordingly, the coordinate pairs of the gaze coordinates are accumulated in the stereo image based on the gaze information of the user, and the 3D gaze coordinates obtained therefrom may be also accumulated.

When the above preparing process is performed, the image processing device 1000 may generate the gaze coordinate information by re-projecting the accumulated 3D gaze coordinates on the stereo image.

Referring back to FIG. 7, in operation 740, the image processing device 1000 may perform the stereo matching based on the feature points and the gaze coordinate information of the stereo image. The image processing device 1000 may perform the stereo matching by restricting a search range of the second image as a certain range from a second gaze coordinate corresponding to a first gaze coordinate near a first feature point of the first image. The first gaze coordinate may be a gaze coordinate closest to a coordinate of the first feature point, from among the gaze coordinates forming the gaze coordinate information, and may be within a certain distance from the first feature point. The image processing device 1000 may obtain a second feature point of the second image corresponding to the first feature point of the first image, based on the restricted range on the epipolar line of the second image, which corresponds to the coordinate of the first feature point of the first image, and a certain range from the second gaze coordinate of the second image corresponding to the first gaze coordinate near the first feature point.

Figure 9:
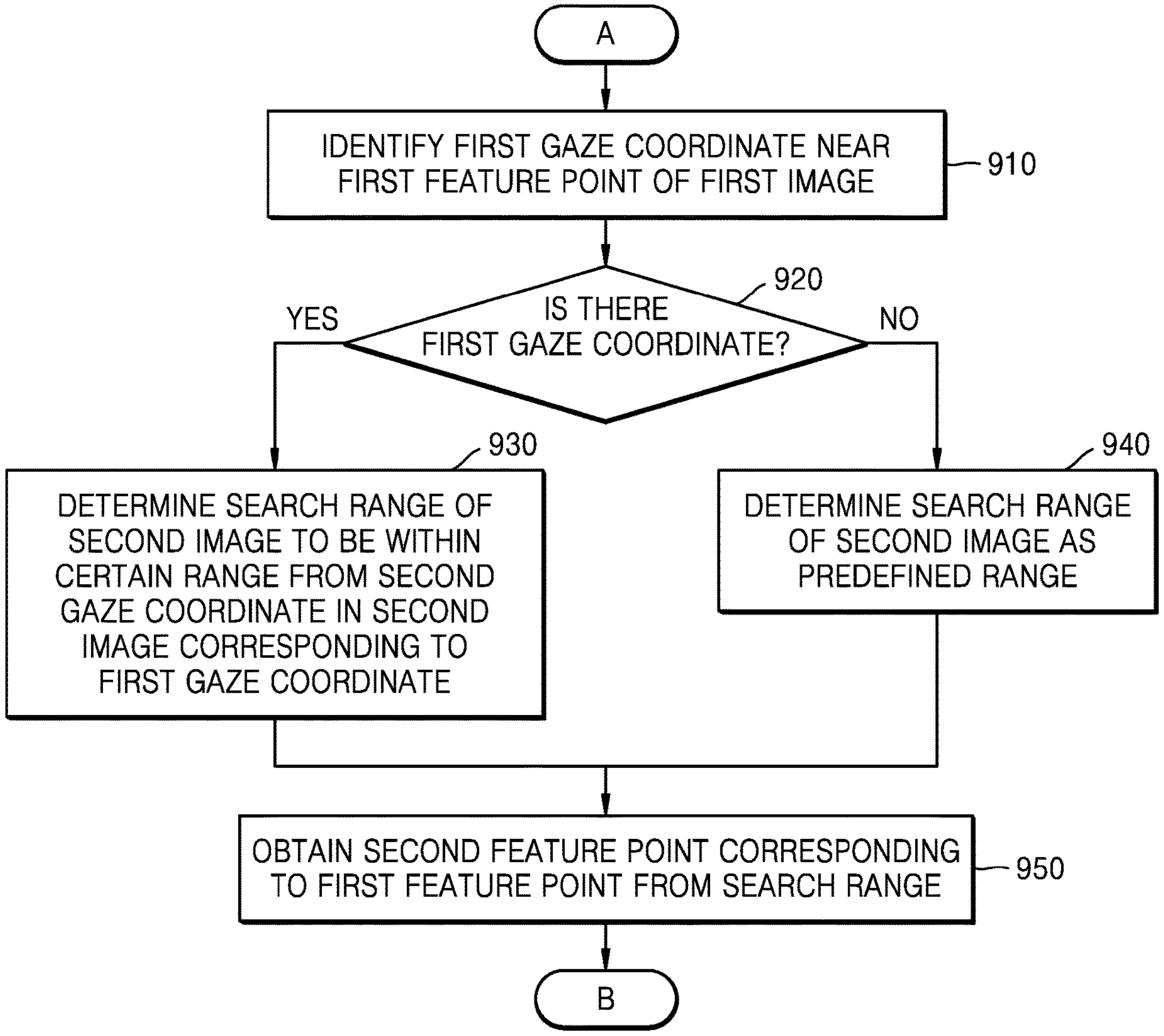
FIG. 9 is a detailed flowchart for describing processes of performing stereo matching in a stereo matching method according to an embodiment of the disclosure.

FIG. 9 is a detailed flowchart for describing a process of performing stereo matching in a stereo matching method according to an embodiment of the disclosure.

In operation 910, the image processing device 1000 may identify a first gaze coordinate near the first feature point of the first image. For example, the first gaze coordinate may be a gaze coordinate closest to a coordinate of the first feature point, from among the gaze coordinates forming the gaze coordinate information, and may be within a certain distance from the first feature point.

In operation 920, the image processing device 1000 may determine whether there is the first gaze coordinate near the first feature point of the first image based on the identification result. The search range of the second image may be determined differently according to whether there is the first gaze coordinate.

In operation 930, when there is the first gaze coordinate near the first feature point of the first image, the image processing device 1000 may determine the search range of the second image to be within a certain range from the second gaze coordinate corresponding to the first gaze coordinate in the second image. Accordingly, the image processing device 1000 may search for the feature point that is included in both of the certain range from the second gaze coordinate of the second image and the restricted range on the epipolar line of the second image corresponding to the coordinate of the first feature point of the first image.

In operation 940, the image processing device 1000 may determine the search range of the second image to be a predefined range when there is no first gaze coordinate near the first feature point of the first image. Accordingly, the image processing device 1000 may search for the feature point included in the restricted range on the epipolar line of the second image, which corresponds to the coordinate of the first feature point of the first image.

In operation 950, the image processing device 1000 may obtain the second feature point of the second image, which corresponds to the first feature point of the first image, in the determined search range of the second image. The image processing device 1000 may obtain, from among the feature points within the search range of the second image, a feature point having the highest similarity to the feature information of the first feature point as the second feature point.

Figure 10:
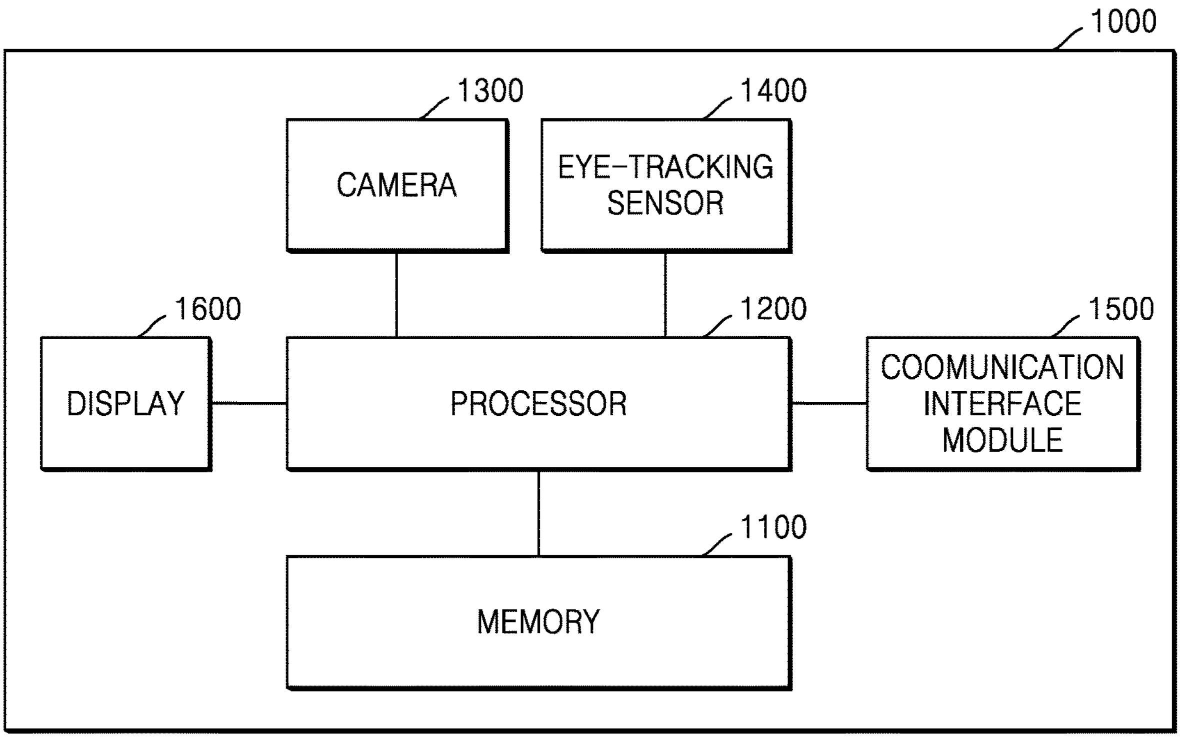
FIG. 10 is a diagram for describing an example of an image processing device according to an embodiment of the disclosure.

FIG. 10 is a diagram for describing an example of the image processing device 1000 according to an embodiment of the disclosure.

FIG. 10 shows an example in which the image processing device 1000 is a smart phone or a digital camera. The image processing device 1000 may further include a communication interface module 1500 and a display 1600, in addition to the memory 1100, the processor 1200, the camera 1300, and the eye-tracking sensor 1400 described above. In addition, the image processing device 1000 may also include a location sensor for sensing the location of the image processing device 1000 or a power unit supplying the power to the image processing device 1000, but descriptions thereof are omitted.

In an embodiment, the communication interface module 1500 may perform wired/wireless communication with another device or a network. To do this, the communication interface module 1500 may include a communication module supporting at least one of various wired/wireless communication methods. For example, the communication module performing near field communication such as wireless fidelity (Wi-Fi) or Bluetooth, various kinds of mobile communication, or ultra-wideband communication may be included. The communication interface module 1500 is connected to an external device located outside the image processing device 1000 that is a smart phone, and may transfer to the external device images obtained or generated by the image processing device 1000.

In another embodiment, the display 1600 may include an output unit for providing information or images, and may further include an input unit for receiving an input. The output unit may include a display panel and a controller for controlling the display panel, and may be implemented in various types, for example, an organic light-emitting diode (OLED) display, an active-matrix OLED (AM-OLED) display, a liquid crystal display (LCD), etc. The input unit may receive from a user an input in various forms, and may include at least one of a touch panel, a keypad, a pen recognition panel, etc. The display 1600 may be provided in the form of a touch screen in which a display panel and a touch panel are integrated, and may be flexible or foldable.

Figure 11:
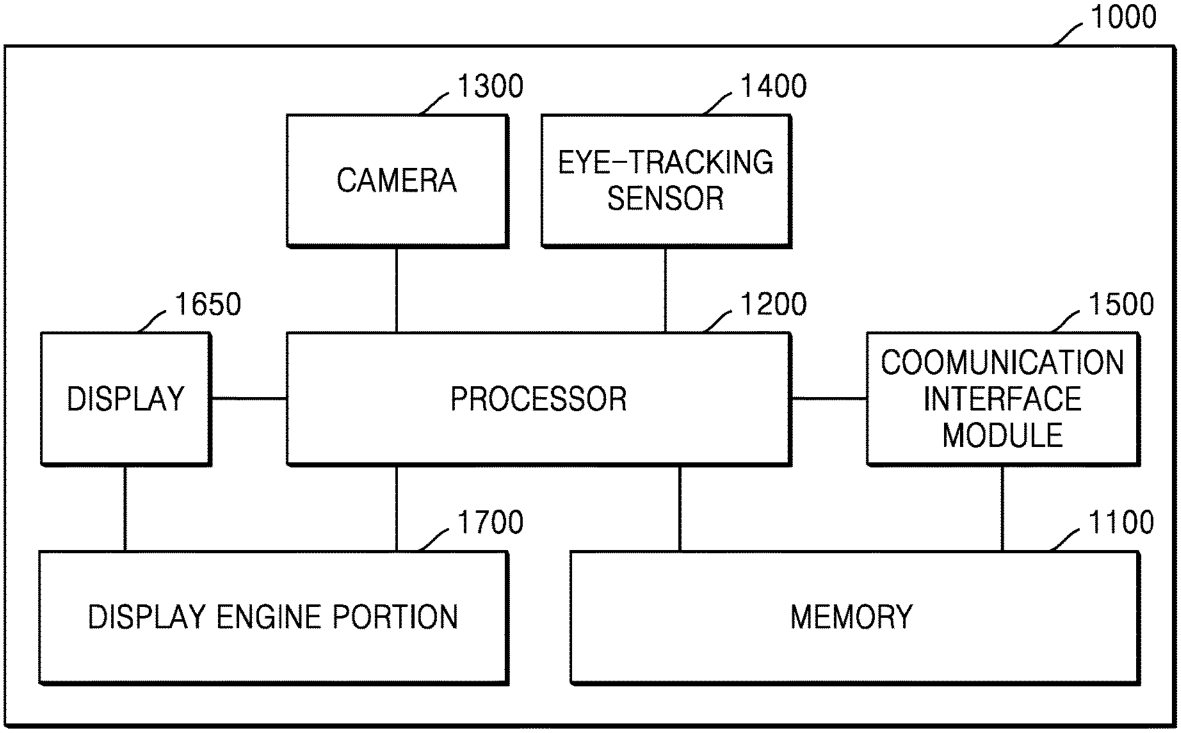
FIG. 11 is a diagram for describing another example of an image processing device according to an embodiment of the disclosure.

FIG. 11 is a diagram for describing another example of the image processing device 1000 according to an embodiment of the disclosure.

FIG. 11 shows an example in which the image processing device 1000 is an augmented reality device. The image processing device 1000 may include the memory 1100, the processor 1200, the camera 1300, the eye-tracking sensor 1400, the communication interface module 1500, a display 1650, and a display engine portion 1700. In addition, the image processing device 1000 may also include a location sensor for sensing the location of the image processing device 1000 or a power unit supplying the power to the image processing device 1000, but descriptions thereof and the descriptions provided above are omitted.

The communication interface module 1500 is connected to an external device located outside the image processing device 1000 that is an augmented reality device, and may transfer to the external device images obtained or generated by the image processing device 1000.

In an embodiment, the image processing device 1000 that is an augmented reality device may provide a pop-up of a virtual image via the display 1650 and the display engine portion 1700. The virtual image may be generated by an optical engine and may include both a static image and a dynamic image. Such a virtual image is observed together with a real scene, that is, a scene of the real world viewed by the user through an augmented reality device, and may be an image showing information about the real-world object in the real scene, information about an operation of the image processing device 1000 that is the augmented reality device, or a control menu.

In another embodiment, the display engine portion 1700 may include an optical engine that generates and projects a virtual image, and a guide unit that guides light of the virtual image projected from the optical engine to the display 1650. The display 1650 may include a waveguide of a see-through type embedded in a left-eye lens unit and/or a right-eye lens unit of the image processing device 1000 that is the augmented reality device. The display 1650 may display the virtual image representing information about the object, information about operation of the image processing device 1000, or control menu.

When the pop-up of the virtual image is displayed on the display 1650, the user wearing the image processing device 1000 that is the augmented reality device exposes the hand to the camera 1300 in order to manipulate the pop-up of the virtual image and allows the exposed hand to select the function of the image processing device 1000 in the pop-up of the virtual image to execute the function.

In an embodiment, the processor 1200 of the image processing device 1000 that is the augmented reality device may determine a gaze point of the user or gaze movement of the user by using the eye-tracking sensor 1400 to use the gaze point or the gaze movement to control the image processing device 1000. The processor 1200 may control the direction of the camera 1400 according to the gaze point or the gaze movement determined by the eye-tracking sensor 1400, and may obtain at least one image. For example, the user may obtain an image from a first direction by wearing the image processing device 1000 that is the augmented reality device, and then, may obtain another image from a second direction after controlling the direction of the camera 1300 according to the gaze point or the gaze movement of the user.

The image processing device 1000 described herein may be implemented using hardware components, software components, and/or combination of the hardware components and the software components. For example, the image processing device 1000 described in the embodiments may be implemented with one or more general purpose computers or special purpose computers such as a processor, an arithmetic logic unit (ALU), an application specific integrated circuit (ASIC), a digital signal processor (DSP), a digital signal processing device (DSPD), a programmable logic device (PLD), a microcomputer, a microprocessor, or any device capable of executing and responding to instructions.

The software may include a computer program, a code, an instruction, or a combination of one or more thereof, for independently or collectively instructing or configuring the processing device to operate as desired.

In an embodiment, the software may be implemented as computer programs including instructions stored in a computer-readable storage medium. Examples of the computer-readable recording medium include magnetic storage media (e.g., ROM, RAM, floppy disks, hard disks, etc.), and optical recording media (e.g., compact disc read only memory (CD-ROMs) or Digital Versatile Discs (DVDs)). The computer-readable recording medium may also be distributed over network coupled computer systems so that the computer-readable code is stored and executed in a distributive manner. This media may be read by the computer, stored in the memory, and executed by the processor.

A computer is a device capable of fetching instructions stored in a storage medium and operating according to the instructions, and may include the image processing device 1000 according to one or more embodiments of the disclosure.

The computer-readable storage medium may be provided in the form of a non-transitory storage medium. Here, the term 'non-transitory' simply denotes that the storage medium is a tangible device, and does not include a signal, but this term does not differentiate between where data is semi-permanently stored in the storage medium and where the data is temporarily stored in the storage medium.

Also, the method according to one or more embodiments of the disclosure may be provided to be included in a computer program product. The computer program product may be traded between a seller and a buyer as a product.

The computer program product may include a software program, or a computer-readable storage medium on which the software program is stored. For example, the computer program product may include a product in the form of a software program (e.g., downloadable application) that is electronically distributed by the manufacturer of the image processing device 1000 or by an electronic market (e.g., Google Play store®, or App store®). For electronic distribution, at least a part of a software program may be stored in a storage medium or temporarily generated. In this case, the storage medium may include a server of a manufacturer, a server of an electronic market, or a storage medium of a relay server that temporarily stores a software program.

In an embodiment, the computer program product may include a storage medium of a server or a storage medium of a terminal in a system consisting of the server and the terminal (e.g., image processing device). Alternatively, when there is a third device (e.g., smartphone) communicating with the server or the terminal, the computer program product may include a storage medium of the third device. Alternatively, the computer program product may include a software program itself that is transferred from the server to the terminal or the third device, or from the third device to the terminal.

In this case, one of the server, the terminal, and the third device may execute the computer program product to perform the method according to the embodiments of the disclosure. Alternatively, two or more of the server, the terminal, and the third device may execute the computer program product to implement the method according to the embodiments of the disclosure in a distributed manner.

For example, the server (e.g., a cloud server, an AI server, etc.) may execute the computer program product stored in the server, and may control the terminal communicating with the server to execute the method according to the embodiments of the disclosure.

In another example, the third device may execute the computer program product and may control the terminal communicating with the third device to execute the method according to the embodiments of the disclosure.

When the third device execute the computer program product, the third device downloads the computer program product from the server and executes the computer program product. Alternatively, the third device may execute the computer program product provided in a preloaded state to perform the method according to the embodiments of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An image processing device comprising:

a camera system including a first camera and a second camera, the camera system configured to obtain a stereo image;

an eye-tracking sensor configured to obtain gaze information of a user;

memory storing one or more instructions; and at least one processor communicatively coupled to the camera system, the eye-tracking sensor and the memory, wherein the one or more instructions, when executed by the at least one processor individually or collectively, cause the image processing device to:

extract feature points from the stereo image, the feature points comprising first image feature points of a first image captured by the first camera and second image feature points of a second image captured by the second camera, generate gaze coordinate information including gaze coordinates corresponding to gaze information of the user relative to the first image and the second image, and perform stereo matching between the first image and the second image based on a first feature point from among the first image feature points and a second feature point from among the second image feature points, and wherein the second feature point is searched within a search range on the second image, the search range being restricted based on a second gaze coordinate corresponding to a first gaze coordinate associated with the first feature point.

2. The image processing device of claim 1, wherein the instructions, when executed by the at least one processor individually or collectively, further cause the image processing device to:

perform the stereo matching by restricting the search range of the second image to be a certain range from the second gaze coordinate corresponding to the first gaze coordinate near the first feature point of the first image.

3. The image processing device of claim 2, wherein the first gaze coordinate is a gaze coordinate closest to a coordinate of the first feature point, from among the gaze coordinates forming the gaze coordinate information.

4. The image processing device of claim 1, wherein the instructions, when executed by the at least one processor individually or collectively, further cause the image processing device to:

obtain the second feature point of the second image corresponding to a first feature point, based on a restricted range on an epipolar line of the second image corresponding to a coordinate of the first feature point of the first image, and on a certain range from the second gaze coordinate of the second image corresponding to the first gaze coordinate near the first feature point.

5. The image processing device of claim 1, wherein the instructions, when executed by the at least one processor individually or collectively, further cause the image processing device to:

identify the first gaze coordinate near the first feature point of the first image;

determine the search range of the second image based on a result of the identification; and obtain the second feature point of the second image corresponding to the first feature point within the search range.

6. The image processing device of claim 5, wherein the instructions, when executed by the at least one processor individually or collectively, further cause the image processing device to:

when there is the first gaze coordinate, determine the search range to be within a certain range from the second gaze coordinate in the second image corresponding to the first gaze coordinate; and when there is no first gaze coordinate, determine the search range to be a predefined range.

7. The image processing device of claim 5, wherein the instructions, when executed by the at least one processor individually or collectively, further cause the image processing device to:

obtain as the second feature point, from among feature points within the search range, a feature point having highest similarity to feature information of the first feature point.

8. The image processing device of claim 1, wherein the instructions, when executed by the at least one processor individually or collectively, further cause the image processing device to:

obtain a coordinate pair of gaze coordinates from the stereo image, based on the gaze information obtained by using the eye-tracking sensor, and accumulate, in the memory, three-dimensional (3D) gaze coordinates obtained from the coordinate pair; and generate the gaze coordinate information by re-projecting the accumulated 3D gaze coordinates onto the stereo image.

9. The image processing device of claim 1, wherein the instructions, when executed by the at least one processor individually or collectively, further cause the image processing device to perform a process of generating the gaze coordinate information in parallel with a process of extracting the feature points.

10. A stereo matching method performed by an image processing device, the stereo matching method comprising:

obtaining, by the image processing device, a stereo image by using a camera system including a first camera and a second camera;

extracting, by the image processing device, feature points from the stereo image, the feature points comprising first image feature points of a first image captured by the first camera and second image feature points of a second image captured by the second camera;

generating, by the image processing device, gaze coordinate information including gaze coordinates corresponding to gaze information of a user relative to the first image and the second image; and performing, by the image processing device, stereo matching between the first image and the second image based on a first feature point from among the first image feature points and a second feature point from among the second image feature points, wherein the second feature point is searched within a search range on the second image, the search range being restricted based on a second gaze coordinate corresponding to a first gaze coordinate associated with the first feature point.

11. The stereo matching method of claim 10, wherein the performing of the stereo matching comprises:

performing the stereo matching by restricting the search range of the second image to a certain range from the second gaze coordinate corresponding to the first gaze coordinate near the first feature point of the first image.

12. The stereo matching method of claim 10, wherein the performing of the stereo matching comprises:

obtaining the second feature point of the second image corresponding to a first feature point, based on a restricted range on an epipolar line of the second image corresponding to a coordinate of the first feature point of the first image, and on a certain range from the second gaze coordinate of the second image corresponding to the first gaze coordinate near the first feature point.

13. The stereo matching method of claim 10, wherein the performing of the stereo matching comprises:

identifying the first gaze coordinate near the first feature point of the first image;

determining the search range of the second image, based on a result of the identification; and obtaining the second feature point of the second image from the search range, the second feature point corresponding to the first feature point.

14. The stereo matching method of claim 10, further comprising:

obtaining the gaze information by using an eye-tracking sensor;

obtaining a coordinate pair of gaze coordinates from the stereo image, based on the gaze information; and accumulating three-dimensional (3D) gaze coordinates obtained from the coordinate pair, wherein the generating of the gaze coordinate information comprises:

generating the gaze coordinate information by re-projecting the accumulated 3D gaze coordinates onto the stereo image.

15. A non-transitory computer-readable storage medium storing instructions that, when executed by at least one processor of an image processing device individually or collectively, cause the image processing device to perform operations, the operations comprising:

obtaining, by the image processing device, a stereo image by using a camera system including a first camera and a second camera;

extracting, by the image processing device, feature points from the stereo image, the feature points comprising first image feature points of a first image captured by the first camera and second image feature points of a second image captured by the second camera;

generating, by the image processing device, gaze coordinate information including gaze coordinates corresponding to gaze information of a user relative to the first image and the second image; and performing, by the image processing device, stereo matching between the first image and the second image based on a first feature point from among the first image feature points and a second feature point from among the second image feature points, wherein the second feature point is searched within a search range on the second image, the search range being restricted based on a second gaze coordinate corresponding to a first gaze coordinate associated with the first feature point.

16. The non-transitory computer-readable storage medium of claim 15, the operations further comprising:

performing the stereo matching by restricting the search range of the second image to a certain range from the second gaze coordinate corresponding to the first gaze coordinate near the first feature point of the first image.

17. The non-transitory computer-readable storage medium of claim 15, the operations further comprising:

obtaining the second feature point of the second image corresponding to a first feature point, based on a restricted range on an epipolar line of the second image corresponding to a coordinate of the first feature point of the first image, and on a certain range from the second gaze coordinate of the second image corresponding to the first gaze coordinate near the first feature point.

* * * * *